United States Patent Office 3,406,227
Patented Oct. 15, 1968

3,406,227
METHOD OF FABRICATING LOW PERMEABILITY NUCLEAR FUEL BODIES
Geoffrey R. Tully, Jr., and Walter V. Goeddel, Poway, Calif., assignors, by mesne assignments, to Gulf General Atomic Incorporated, San Diego, Calif., a corporation of Delaware
No Drawing. Filed Oct. 19, 1962, Ser. No. 231,818
2 Claims. (Cl. 264—.5)

The present invention generally relates to fuel bodies and more particularly relates to improved low permeability, graphite matrix, nuclear fuel bodies and to a method of making the same.

In operating nuclear reactors, it is usually highly important to restrict as far as possible fission product migration from the nuclear fuel into the environment around the fuel (coolant, etc.). This reduces the degree of radiation contamination of the reactor and minimizes health hazards, etc. High temperature nuclear reactors operating at, for example, temperatures in excess of about 1000° C. are especially subject to the problem of control of fission product migration because fission product migration generally increases with temperature.

It must also be understood that it is important to prepare the nuclear fuel for a nuclear reactor in a form which will be durable and stable under the conditions of operation in the nuclear reactor. It has been especially difficult to obtain nuclear fuel which will be durable and stable throughout long periods of continued use in high temperature reactors. One form of high temperature reactor which is known as the HTGR (high temperature graphite reactor) employs solid fuel bodies in which the nuclear fuel is mixed with graphite moderator. This reactor is more fully described in Nucleonics, volume 18, No. 1, pp. 86–90, published January 1960.

Various procedures have been devised for the production of nuclear fuel bodies for an HTGR type of high temperature nuclear reactor. Fuel bodies have been constructed which have a relatively low permeability to fission product gases, but the production procedures employed have in many instances been relatively long, involved and complicated. Moreover, the permeability of these finished fuel bodies in some instances has still been undesirably high in view of the contemplated use of such fuel bodies in the reactors for long periods of continuous operation. Accordingly, it is desirable to provide a relatively simple, effective method of producing a solid fuel body for a nuclear reactor, particularly of the high temperature type, which nuclear fuel body would be capable of operating over long periods of time at temperatures in excess of about 1000° C. while allowing a very low rate of migration of gaseous fission products therefrom.

Accordingly, it is a primary object of the present invention to provide an improved solid, high temperature nuclear fuel body. It is a further object of the present invention to provide an improved solid, nuclear fuel body incorporating nuclear fuel in a moderating matrix, which fuel body has very low permeability to fission product gases. It is a still further object of the present invention to provide a solid high temperature nuclear fuel body which has improved durability and stability for use in a nuclear reactor at temperature in excess of about 1000° C. and a method of making the same. It is another object of the present invention to provide a simple, effective method of producing a solid nuclear fuel body for a high temperature nuclear reactor, which method preserves the integrity of the nuclear fuel during fabrication of the fuel body.

Further objects and advantages of the present invention will be apparent from a study of the following detailed description.

The present invention includes a method of making a high temperature solid nuclear fuel body. More particularly, the method comprises enclosing individual solid nuclear fuel particles in a protective jacket, dispersing the protected particles in a graphite matrix, compacting the resultant mixture to a solid fuel body and then treating the fuel body so as to reduce the gas permeability thereof to a very low level. The method of reducing the permeability of body is carried out while maintaining the integrity of the nuclear fuel. An improved nuclear fuel body is thereby obtained.

Now more particularly considering the individual steps of the method of the present invention, nuclear fuel particles, such as uranium dicarbide ($UC_2$) and/or thorium dicarbide ($ThC_2$), in the enriched or unenriched form (that is, with or without fissile material such as $U^{235}$), are coated with a protective carbon layer or covering, such as a pyrolytic carbon coating. The pyrolytic carbon coating can be applied to the individual fuel particles (which may be of any desired average size, for example 100–300 microns) by any suitable technique. For instance, the particles can be suspended or otherwise disposed in an atmosphere of hydrocarbon gas, e.g. methane, in a heating zone and the temperature in said zone then raised above the decomposition point of the gas, about 1400–1800° C. for methane. Upon decomposition of the hydrocarbon gas, carbon is deposited on the surfaces of the fuel particles. Preferably this procedure is carried out until a layer of pyrolytic carbon, approximately at least 15 microns thick, wholly encases each of the fuel particles. The pyrolytic carbon coating protects the nuclear fuel against debilitation by and reaction with water and other reactive outgassing products normally present during certain of the subsequent steps of the present method.

Although nuclear fuel carbide particles coated with the pyrolytic carbon can be prepared in any suitable manner, a preferred technique for such production is more particularly described in French Patent No. 1,366,775, entitled Nuclear Fuel. This technique involves the production of nuclear fuel carbides in spherical form preferably having an intermediate protective layer of graphite between the surface of the nuclear fuel and the outer pyrolytic carbon coating. In accordance with this technique, finely divided nuclear fuel, preferably oxide in form, is initially mixed with an amount of finely divided carbon necessary to convert the fuel to the dicarbide form. The mixture is formed into particles of desired size, as by slurrying with a carbonaceous binder and solvent, compacting, drying and granulating. The resultant particles are then disposed in a bed of finely divided graphite where they are spaced from one another to prevent agglomeration thereof.

These particles are then first heated to a temperature above their carburization point, e.g., about 1800–1900° C. When carburization has taken place, the temperature is raised to above the melting point of the particles, e.g., about 2400° C., in order to spheroidize them. It must be understood that the temperatures used will depend on the particular nuclear fuels employed. Upon gradual cooling to ambient temperature and removal from the graphite bed, spheroidized nuclear fuel particles are obtained which comprise fuel carbide particles, the surfaces of which are coated with graphite, (from the graphite bed). These spheroidal particles are then treated, as previously described, to deposit a protective outer coating of pyrolytic carbon over the graphite layer.

An improvement of the just-described technique is set forth in U.S. application, Ser. No. 202,031 filed June 12, 1962 and entitled Reactor Carbides, now Patent No. 3,179,723. In this improved method of forming the nuclear fuel particles, a concentration of finely divided carbon is initially mixed with the nuclear fuel, which concentration is in excess of the stoichiometric amount necessary to form the nuclear fuel dicarbides. Preferably, the amount of carbon is also in excess of that amount which will dissolve in the nuclear fuel at any temperature up to and including the contemplated maximum temperature which will be encountered when the fuel is employed in a nuclear reactor (e.g. about 2400° C.). Thus, absorption into the nuclear fuel of a portion or of all of the pyrolytic carbon coating disposed around each of such particles is prevented, thereby maintaining the integrity and protective nature of the pyrolytic carbon coating and also of the intermediate graphite layer, where present.

In accordance with the present invention, following the disposition of the pyrolytic carbon coating upon the surfaces of the individual nuclear fuel carbide particles, the fuel particles are incorporated into a graphite matrix in a manner to provide a nuclear fuel body having a pore diameter of not more than about 2 microns (as measured by mercury intrusion porosimetry). This can be accomplished in any suitable manner, but preferably involves a hot pressing technique such as that more fully described in U.S. Patent No. 3,031,389.

According to the preferred hot pressing technique, a mixture of nuclear fuel dicarbide, a finely divided graphite and a carbonaceous binder material, preferably pitch, is prepared. The mixture incorporates a sufficient concentration of graphite so that the nuclear fuel particles are uniformly dispersed in the graphite and are at an average distance from one another consistent with nuclear considerations. For example, the graphite powder may be present in the mixture in an amount of from about 60 to about 100 percent, by the combined weight of the nuclear fuel and graphite. The pitch or other carbonaceous binder should be present in a low concentration, but sufficient to facilitate shaping of the mixture to desired form. It has been found that, for most purposes, a concentration of about 5–15 percent by weight of pitch or a like binder is sufficient for the intended purposes.

In order to assure uniform distribution of the nuclear fuel particles with respect to the graphite and pitch, it is desirable to slurry the mixture in a vaporizable organic solvent for the binder, gradually evaporating or otherwise removing the solvent while agitating the particles and graphite. A wet paste can thus be obtained, which can then be preliminarily, lightly pressed to shape, dried and then hot pressed. Alternately, the paste can be dried, ground to particulate form, and then hot pressed.

The hot pressing can be carried at any suitable temperature and pressure, preferably at about 700–900° C. i.e. above the decomposition point of the pitch, and at a pressure of over 2000 p.s.i., preferably 3000–4000 p.s.i., in a suitably shaped die. Also, the hot pressing is preferably performed under a blanket of inert gas, such as argon, krypton or the like, or under a vacuum. The hot pressing technique can be utilized to provide a nuclear fuel body in any desired size and shape, for example, cylindrical, round or the like.

The formed fuel body contains the individual nuclear fuel carbide particles uniformly dispersed in a graphite matrix.

For the purposes of the present invention, pyrolytic carbon coated nuclear fuel particles are employed in such a technique, and the maximum micron size of the graphite employed for the matrix of the fuel body is small, not more than about 50 microns, considerably smaller than the usual micron size of a graphite powder. For this purpose, commercial graphite powder can be ground to the indicated size. The nuclear fuel body so formed should have a maximum pore diameter of about 2 microns. The indicated small pore diameter is necessary for the purposes of the present invention in order to assure a very low gas permeability for the finished fuel body and to minimize the number of gas permeability-reducing steps required to produce the desired low gas permeability.

The thus-produced nuclear fuel body is then treated to reduce the gas permeability thereof to a very low level. In accordance with the present invention, an initial gas permeability for the nuclear fuel body, for example of about $10^{-2}$ cm.$^2$ per sec. (calculated on the basis of permeability to helium at room temperature), can be reduced, for example, to $10^{-6}$ cm.$^2$ per sec. Such a permeability is sufficiently low so as to minimize gaseous fission product migration from the nuclear fuel body during use in a high temperature nuclear reactor.

The permeability of the nuclear fuel body is reduced by impregnating it with a polymerizable substance which will fill the pores of the body and which can be later cured and carbonized. The pyrolytic carbon coating, which has been applied to the individual fuel particles, serves to shield the fuel from any reaction with the products from an organic, polymerizable substance thereby allowing such a permeability-reducing step to be used. The preferred technique for reducing the fuel body permeability is that more particularly described in U.S. application, Ser. No. 132,510, filed Aug. 18, 1961, and entitled Carbon Body Treatment, Now Patent No. 3,167,447. This described technique is directed to the production of low gas permeabiltiy carbon bodies for use in nuclear reactors and for other applications. It has now been found that such a technique is also highly suitable for use in the production of the improved nuclear fuel body in accordance with the present invention.

Such a technique can be successfully employed in the present method by first impregnating the nuclear fuel body with a polymerizable, decomposable substance such as a mixture of maleic anhydride and furfuryl alcohol and then, if desired, clearing a portion of the filled pores of the fuel body. Next the fuel body is slowly heated to a sufficient temperature to cure the impregnant in the pores thereof. Subsequently, the temperature is raised to a still higher temperature to carbonize the polymerized impregnant. The treatment cycle of impregnating, partial pore-clearing, curing and carbonizing, is repeated until the desired low gas permeability is produced in the nuclear fuel body. Finally, the carbonized substance is heat-treated. It has been found that reduction of the gas permeability of the nuclear fuel body to an acceptably low gas permeability of about $10^{-6}$ cm.$^{-2}$ per sec. can ordinarily be accomplished in two gas permeability-reducing treatment cycles, provided that the initial maximum pore diameter of the nuclear fuel body does not exceed about 2 microns. Such initial maximum pore diameter is dependent to a considerable extent on the average micron size of the graphite particles utilized in forming the matrix of the nuclear fuel body, as previously described. The method of forming the nuclear fuel body itself can be controlled to provide a nuclear fuel body with the indicated maximum pore diameter when the graphite particles of the matrix of the fuel body are selected from a fraction 98% of which will pass through a 200 mesh screen.

In the gas permeability-reducing treatment cycle, the pores of the nuclear fuel body are first impregnated with the desired polymerizable, carbonizable substance. Such a substance, as previously indicated, may comprise maleic anhydride and furfuryl alcohol (preferably in a ratio of 1 mol maleic anhydride to 10 mols furfuryl alcohol). Alternatively, but less preferably, such other polymerizable substances as a furfural and phenol mixture or divinyl benzene can be utilized. The viscosity of the polymerizable substance is controlled so as to facilitate the filling of the selective pores and is therefore regulated according to the average size of the pores to be filled.

The initial permeability-reducing cycle may employ an impregnant of somewhat higher viscosity than that employed in subsequent treatment cycles. In this manner, the larger pores of the nuclear fuel body are first filled and the smaller pores are filled in subsequent treatment cycles thereof. However, it has been found that since the average initial pore diameter of the nuclear fuel body is relatively small, the first and subsequent permeability-reducing cycles may all be conducted utilizing impregnants of approximately the same viscosity. It is preferred to employ in such cycles polymerizable substances with a viscosity of from about 200 c.p.s. to about 2000 c.p.s. The viscosity of the polymerizable substance can be controlled by the use of a viscosity-increasing additive or by the use of an impregnant having a greater initial degree of polymerization. For the purposes of the present invention, a mixture of commercially available maleic anhydride and furfuryl alcohol, within the indicated desired viscosity range, can be utilized successfully.

The pore-filling step can be carried out in any suitable manner, as by immersing all or a portion of the nuclear fuel body in a bath of the polymerizable substance. The speed and uniformity of pore-filling can be somewhat increased by first degassing the body and then using pressure to force the polymerizable substance into the surfaces of the nuclear fuel body. Impregnation of the nuclear fuel body to a distance of about one-eighth inch below the surface thereof is ordinarily sufficient to produce the ultimate desired reduction in gas permeability of the nuclear fuel body.

The partial pore-clearing step of the permeability reducing cycle can then be carried out in a manner to clear the impregnant from preferably about 3 to about 10 percent of the pores filled in the initial cycle. The pore clearing is carried out to provide channels throughout the impregnated portion of the fuel body through which gases evolving from the impregnant during the subsequent curing and carbonizing steps of the cycle can readily pass. Localized gas pressure build-up at points in the impregnated portion of the fuel body is hereby avoided, eliminating any cracking and spalling of the fuel body.

The partial pore-clearing step can, for example, be carried out by blowing air into the impregnated portion of the fuel body, or preferably by creating a pressure differential across opposite coated faces of the fuel body. The pressure differential is employed so that pore channels throughout impregnated fuel body are cleared or partially cleared of the polymerizable substance.

In accordance with the gas permeability-reducing technique, the fuel body is then subjected to a curing step, i.e., it is heated to a temperature sufficiently high so that the polymerizable substance in the pores thereof is polymerized or set. The particular temperature and time employed in carrying out such step will depend on the particular polymerizable substance utilized. In most instances, curing can take place at a relatively low temperature for example, 60° C. to 100° C. in the case of a maleic anhydride-furfuryl alcohol mixture. Higher or lower curing temperatures may be employed. In selecting a curing temperature, one which permits relatively rapid curing is preferred, provided that carbonization is not simultaneously effected, and further provided that evolution of gaseous products is not sufficiently rapid to substantially increase the danger of cracking of the fuel body during the curing operation. The coating of pyrolytic carbon about the fuel carbide protects the fuel from any adverse reaction with the water or gases given off during curing. Thus, the provision of such coated fuel particles allows this porosity-lowering step to be carried out without debilitating the fuel.

In carrying out the bore-filling, pore-clearing, curing, carbonizing and heat-treating steps, treatment times and temperatures can be employed as called for in the previously indicated copending U.S. application, Ser. No. 132,510, filed Oct. 18, 1961.

After the impregnant in the pores of the fuel body has thoroughly cured, carbonization is next effected. The carbonizing temperature is selected on the basis of the impregnant to be carbonized and also upon the rate of carbonizing desired. Carbonizing results in the evolution of water vapor and other gases so that the rate of carbonizing must be sufficiently slow to prevent cracking of the fuel body due to build up of localized internal pressures of such gases. Thus, the heating is regulated so that gases are produced at a sufficiently slow rate that they can pass from the fuel body through the cleared pores without any substantial pressure build-up. The carbonizing temperature is maintained until evolution of water and gases has substantially ceased. During such evolution of water vapor and other gases, the nuclear fuel within the fuel particles of the fuel body is effectively protected therefrom, as previously stated, by means of the pyrolytic carbon coating around each of the particles. Thus, no debilitation of the nuclear fuel by such gases occurs, and accordingly, the integrity of the nuclear fuel is preserved throughout the entire permeability-reducing treatment.

The completion of the initial carbonizing step, completes the first cycle of the permeability-reducing treatment. A second cycle which may be substantially identical to the first cycle may then be carried out after the fuel body has first been allowed to gradually cool to about ambient temperature. This second impregnation should be sufficient to fill enough of the remaining unfilled pores at the surfaces of the fuel body to assure reduction of the gas permeability of the fuel body to a desirably low level, for example to the previously indicated permeability of about $10^{-6}$ cm.$^2$ per sec. The partial pore-clearing step can be eliminated during the second cycle of treatment, provided that the curing and carbonizing steps are carefully carried out with a sufficiently gradual temperature increase to substantially eliminate the danger of cracking of the fuel body. Even after the second impregnation, not all of the smallest pores will yet be filled. These pores will adequately serve as channels for the evolving gases produced during the subsequent curing and carbonizing steps so long as such evolution is sufficiently slow.

As a final step, the fuel body is subjected to a heat-treating operation. The heat-treating operation can be carried out in any suitable manner, utilizing temperatures, times and equipment as called for, for example, in copending U.S. application, Ser. No. 132,510, filed Oct. 18, 1961, or any other comparable technique for the in situ conversion of carbon to graphite. However, because of the presence of the fuel particles, the heat-treating should not be carried out at temperatures in excess of 2000° C. It is undesirable to have fuel particles melt during this step and lose their pre-formed configurations.

Subsequent to the heat-treating, the fuel body is slowly cooled to ambient temperature and is then ready for use as a finished product. It can be directly incorporated into a high temperature nuclear reactor of the HTGR or other type and is capable of substantially retaining gaseous fission products at temperatures in excess of 1000° C. over the extended periods of time. Moreover, it is durable and stable.

The following example further illustrates certain features of the present invention.

Example

A quantity of nuclear fuel carbide particles containing approximately equal parts of thorium dicarbide and uranium dicarbide and having an average particle size of about 150 microns were each coated with a wholly enclosing layer of pyrolytic carbon, the layer being approximately 50 microns thick. The coating operation was performed by heating the particles, to about 1500° C. in a methane atmosphere in a suitable furnace.

The pyrolytic carbon-coated particles were then mixed with about 3 parts, by weight, of 200 mesh graphite powder and about 0.3 part, by weight of pitch. The resulting mass was then placed in a graphite die in a press and heated in a vacuum to about 700° C. while being subjected to a pressure of about 4000 p.s.i. The hot pressing was carried out for a period of about 30 mniutes, at the end of which time the resulting fuel body was cooled to ambient temperature. The fuel body produced had a maximum pore diameter of less than 2 microns. Next, the hot-pressed fuel body was degassed at a pressure of 1 inch of mercury for 2 hours and then immediately immersed in a mixture of furfuryl alcohol and maleic anhydride, 10 mols to 1 mol respectively. After immersion in the mixture for 16 hours, the fuel body was withdrawn from the bath, wiped free of excess impregnant, and subjected to a stream of air at ambient temperature. Approximately 5 percent of the filled pores of the fuel body were cleared of impregnant. Thereafter, the fuel body was cured at 60° C. for 16 hours; then the temperature was raised to 100° C. for 5 hours. The body was then moved to a carbonization furnace where it was heated to 500° C. at a temperature rise rate of 13° C. per hour. From 500° C., the temperature was raised to 900° C. at a rate of 50° C. per hour.

The fuel body was again impregnated in the previously described manner and subjected to similar curing and carbonizing steps. However, this time the pore-clearing step was eliminated. Next the fuel body was heat-treated by slowly heating to 1900° C. and maintaining this temperature for 30 minutes. Finally, the body was cooled to ambient temperature. The resulting product was found to be crack-free and has a gas permeability of less than $10^{-6}$ cm.$^2$ per sec. It was of uniform size and shape and was hard and dense. The body was found to be durable and stable in use. Metallurgical examination indicated that the nuclear fuel particles within the fuel body had not been debilitated by the permeability-reducing treatment and that the pyrolytic carbon coatings thereon were intact.

The preceding example clearly illustrates that improved nuclear fuel bodies incorporating nuclear fuel carbides in a graphite matrix and exhibiting a low gas permeability to gases along with suitable durability and stability can be readily produced in a relatively simple yet effective manner. These fuel bodies have particular application in high temperature nuclear reactors, and offer efficient performance, including a high degree of fission product retention and durability and stability over an extended period of time. Further advantages of the present invention are as set forth in the foregoing.

Various of the features of the present invention are set forth in the appended claims.

What is claimed is:

1. A method of making a solid, high temperature, nuclear fuel body, which method comprises the steps of compacting a mixture of finely divided graphite and discrete nuclear fuel carbide particles, each of which particles is coated with a protective layer of pyrolytic carbon, into a solid fuel body having a maximum pore diameter of about 2 microns, impregnating a portion of the pores of said fuel body with a polymerizable substance, curing and carbonizing said substance within said pores, repeating said impregnating, curing and carbonizing steps until the gas permeability of said fuel body is substantially reduced, and thereafter heat-treating said carbonized substance within the pores of said fuel body to produce a fuel body having excellent fission product retention.

2. A method of making a solid, high temperature, nuclear fuel body, which method comprises the steps of mixing 200 mesh graphite powder with a binder and with discrete nuclear fuel carbide particles, each of which particles is coated with a protective layer of pyrolytic carbon, to disperse said coated nuclear fuel particles uniformly within said finely divided graphite, said graphite being present in an amount at least about 60 percent by weight of said nuclear fuel particles plus graphite, compacting said mixture into a solid fuel body having a maximum pore diameter of about 2 microns, impregnating a portion of the pores of said fuel body with a polymerizable substance, curing and carbonizing said substance within said pores, repeating said impregnating, curing, and carbonizing steps until the gas permeability of said fuel body is reduced to at least about $10^{-6}$ cm.$^2$ per second, and thereafter heat-treating said carbonized substance within the pores of said fuel body to produce a fuel body having excellent fission product retention.

References Cited

UNITED STATES PATENTS

| | | | |
|---|---|---|---|
| 3,018,238 | 1/1962 | Layer et al. | |
| 3,031,389 | 4/1962 | Goeddel et al. | |
| 3,146,173 | 8/1964 | Fortesque et al. | 176—71 |
| 3,166,614 | 1/1965 | Taylor | 264—.5 |
| 3,212,989 | 10/1965 | Fitzer et al. | 176—71 |

FOREIGN PATENTS

| | | |
|---|---|---|
| 850,016 | 9/1960 | Great Britain. |
| 878,927 | 10/1961 | Great Britain. |

OTHER REFERENCES

AEC Report TID–10001, September 1958, pp. 8–12.

AEC Report NYO–9064, April 1961, pp. 7–1 and 7–2.

2nd Geneva Conference on Atomic Energy, September 1958, pp. 543–548, vol. 6.

Goldstein et al. Stable Furfuryl Alcohol Impregnating Solutions. Industrial and Engineering Chemistry, vol. 52, No. 1, January 1960, pp. 57 and 58.

Nuclear Metallurgy, vol. VI, November, pp. 87–94.

Boyland: The Reduction of the Permeability of Graphite, G. E. C. Atomic Energy Review, vol. 2, No. 1, pp. 44–50, March 1959.

Watt et al. Production of Impermeable Graphite, Nuclear Power, February 1959, pp. 86–88.

L. DEWAYNE RUTLEDGE, *Primary Examiner.*